July 24, 1951 C. E. TIBBALS 2,561,544
DRIVE MECHANISM FOR SHAKER CONVEYERS
Filed June 10, 1947 7 Sheets-Sheet 2
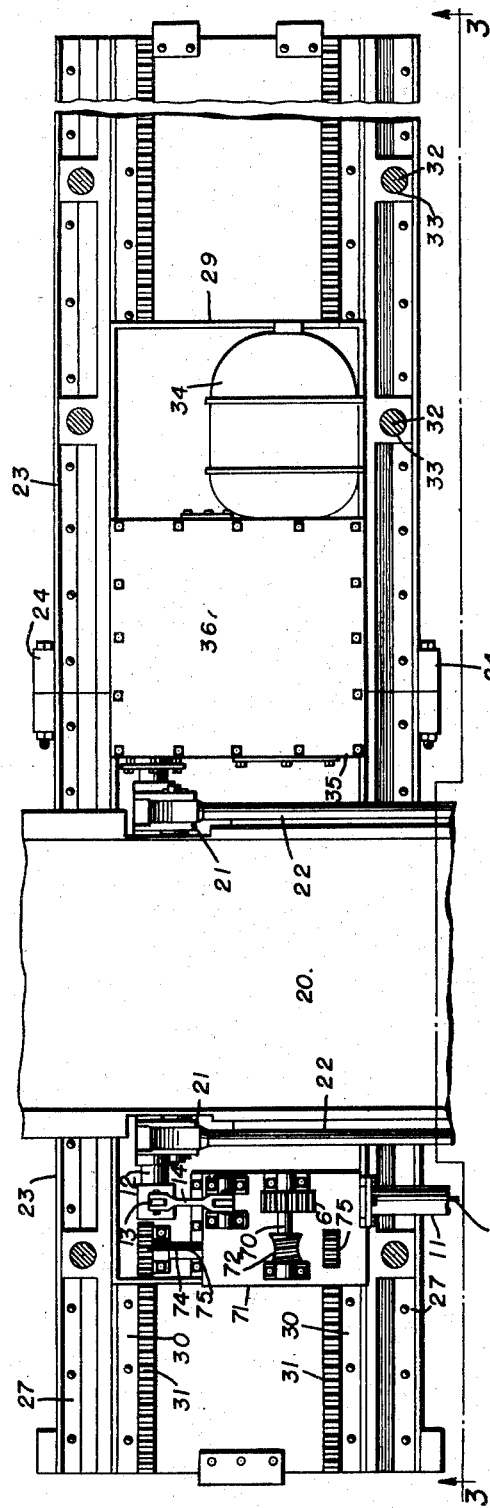
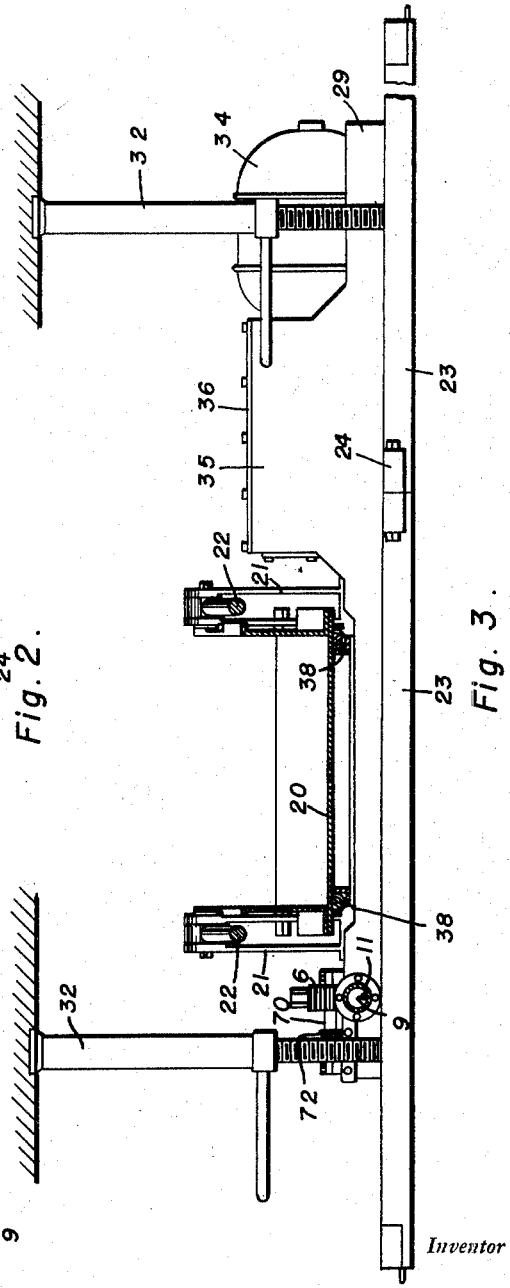
Inventor
Charles E. Tibbals
By
Attorneys Inventor
Charles E. Tibbals

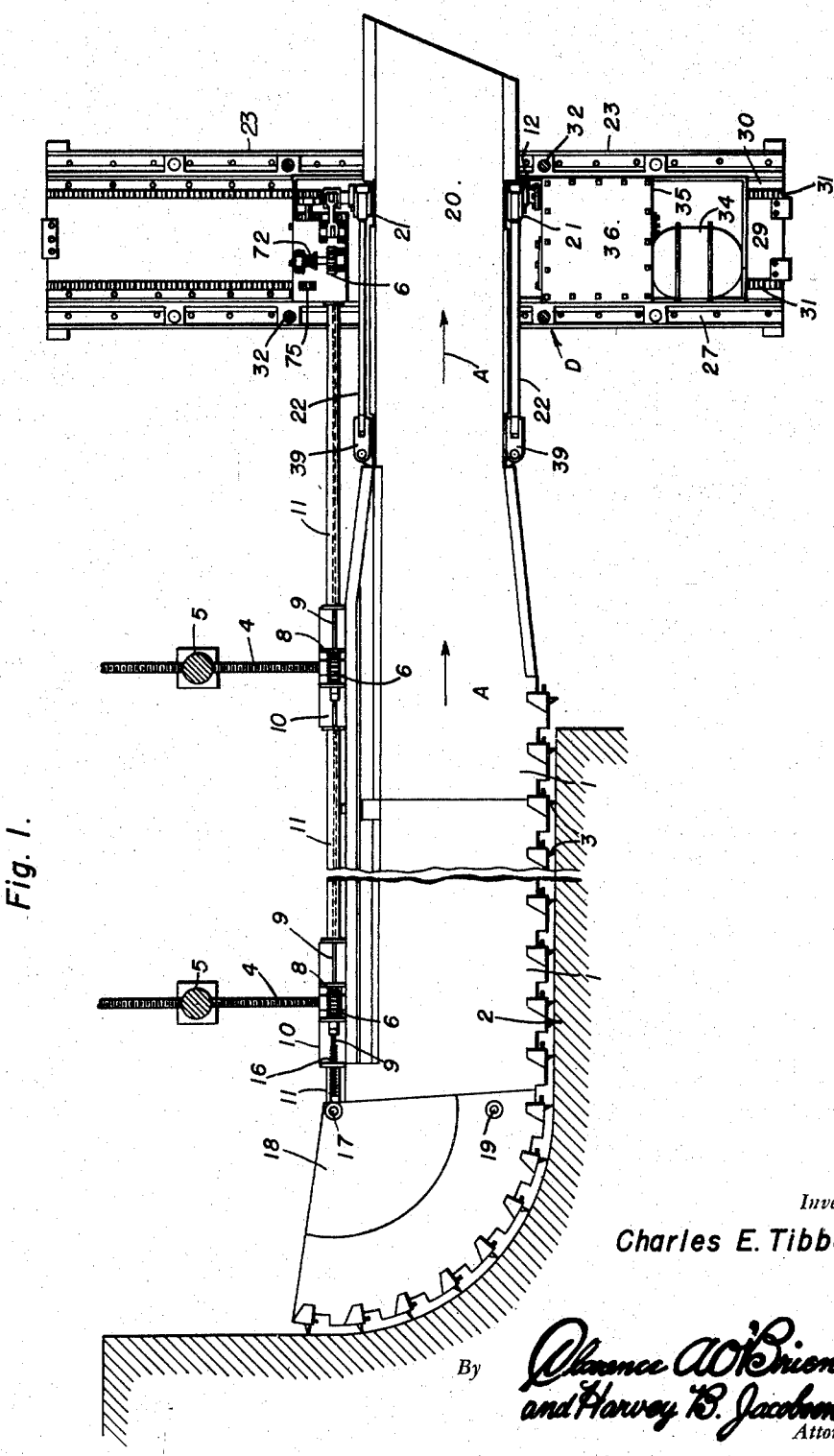

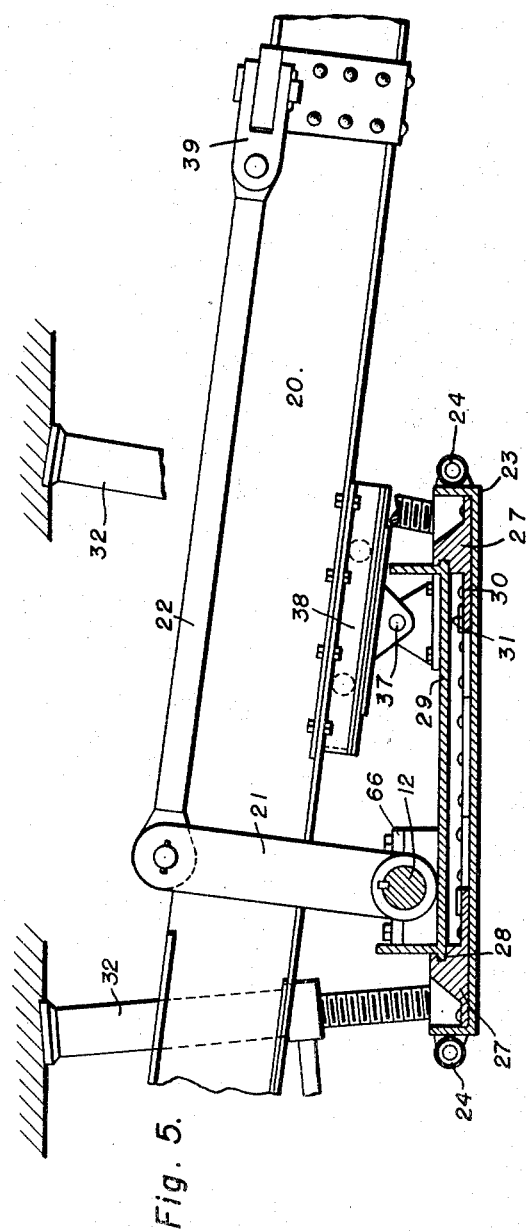
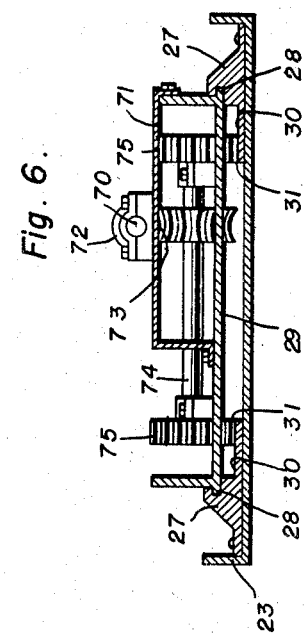

July 24, 1951   C. E. TIBBALS   2,561,544
DRIVE MECHANISM FOR SHAKER CONVEYERS
Filed June 10, 1947   7 Sheets-Sheet 5
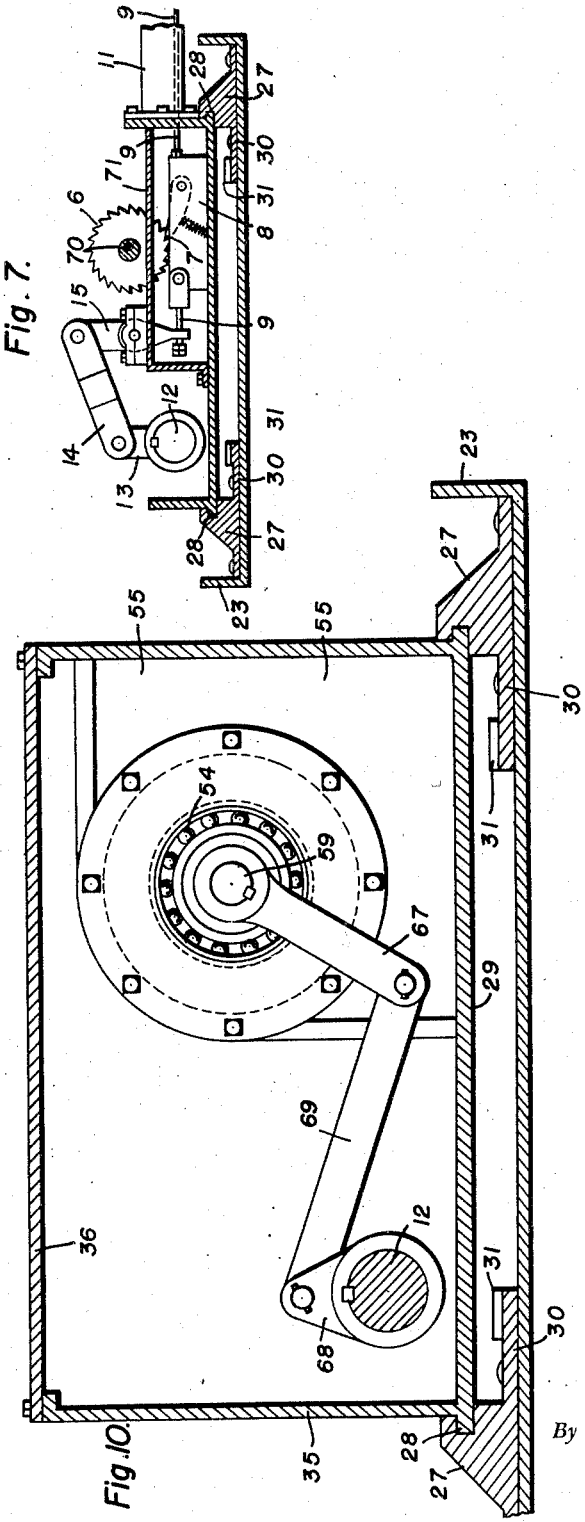
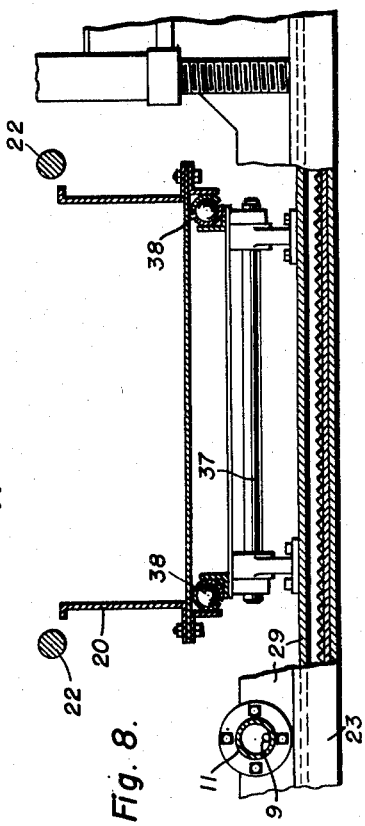
Inventor
Charles E. Tibbals July 24, 1951  C. E. TIBBALS  2,561,544
DRIVE MECHANISM FOR SHAKER CONVEYERS
Filed June 10, 1947 7 Sheets-Sheet 6

Inventor
Charles E. Tibbals
By Clarence A. O'Brien
and Harvey B. Jacobson
Attorneys July 24, 1951  C. E. TIBBALS  2,561,544
DRIVE MECHANISM FOR SHAKER CONVEYERS
Filed June 10, 1947  7 Sheets-Sheet 7
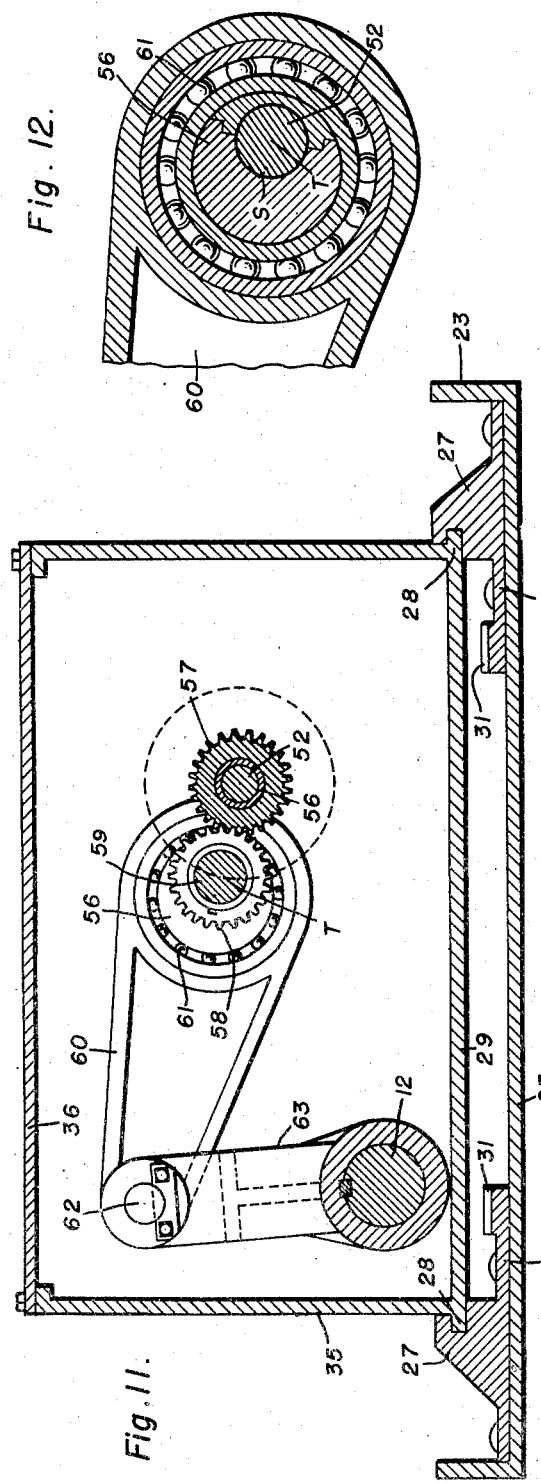
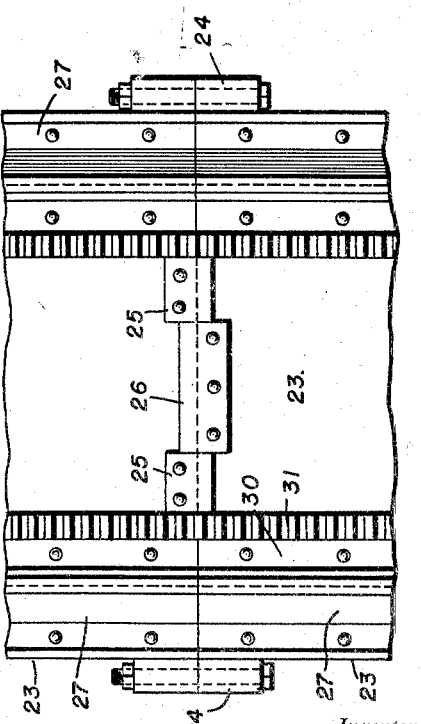
Inventor
Charles E. Tibbals
By Clarence A. O'Brien
and Harvey B. Jacobson
Attorneys Patented July 24, 1951

2,561,544

UNITED STATES PATENT OFFICE 2,561,544

DRIVE MECHANISM FOR SHAKER CONVEYERS

Charles E. Tibbals, Oneida, Tenn.

Application June 10, 1947, Serial No. 753,671

3 Claims. (Cl. 74—75)

This invention relates to improvements in drive mechanisms for shaker conveyors of the type employed for conveying loose material, such as mined coal.

The primary object of the present invention is to provide an efficient drive mechanism embodying simple means for effectively converting the constant speed rotary motion of a drive crank into varying speed reciprocating motion of driven conveyor actuating connecting rods or pitmans.

Another object is to provide a drive mechanism of the above kind wherein means is provided to automatically variably accelerate and decelerate the motion of the connection rods or pitmans to a predetermined extent during each reciprocation of the latter, so as to secure maximum conveying efficiency.

A furter object is to provide improved means for mounting the drive mechanism for movement in a direction toward the coal face as required to keep the conveyor in close proximity to such face as the mining operation proceeds, and to provide improved means to automatically so move the drive mechanism during operation of the conveyor.

The exact nature of the present invention, as well as more specific objects and features thereof, will become apaprent from the following description when considered in connection with the accompanying drawings, in which:

Figure 1 is a top plan view, partly broken away, of a long wall mining machine embodying a drive mechanism constructed in accordance with the present invention;

Figure 2 is an enlarged fragmentary top plan view thereof, partly broken away;

Figure 3 is a vertical section on line 3—3 of Figure 2, partly broken away;

Figure 4:
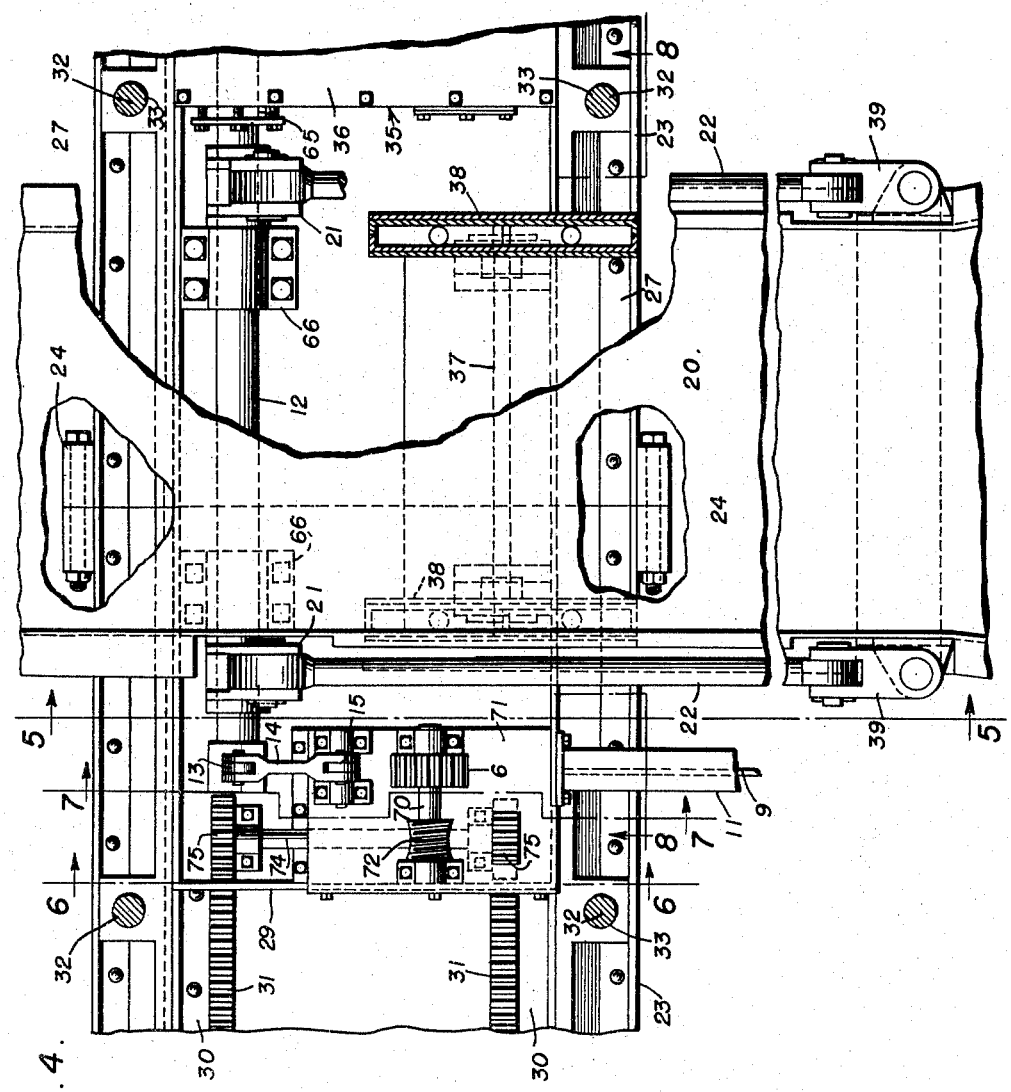
Figure 4 is a top plan view of a portion of the construction shown in Figure 2, enlarged to more clearly reveal certain details and partly broken way to reveal other details.
Figure 9:
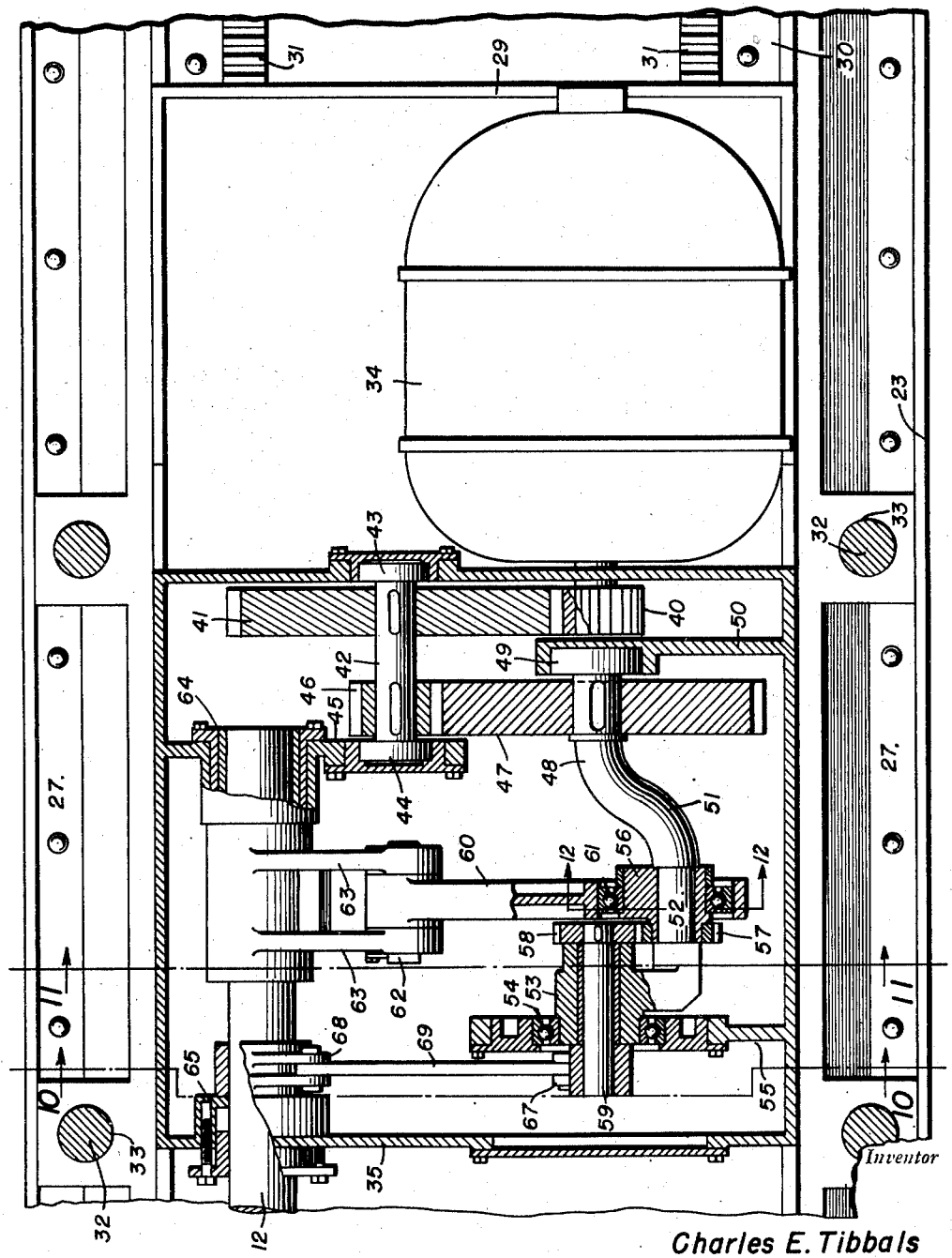

Figures 5, 6, 7 and 8 are vertical sections taken respectively on line 5—5, line 6—6, line 7—7, and line 8—8 of Figure 4;

Figure 9 is an enlarged fragmentary view, showing the bed and the carriage in top plan and the drive mechanism in horizontal section;

Figure 10 is a vertical section on line 10—10 of Figure 9;

Figure 11 is a vertical section on line 11—11 of Figure 9;

Figure 12 is a sectional detail taken on line 12—12 of Figure 9; and

Figure 13 is a fragmentary top plan view of the bed.

Referring in detail to the drawings, the present invention is shown adapted to the type of long wall mining machine shown in my U. S. Letters Patent No. 2,399,713, dated May 7, 1946. The invention has as an environment a shaker conveyor which also acts as an undercutter and consists of a series of overlapping plates 1 resting, at the side portions thereof nearest the pillar 2 upon the mine floor. The edges of the plates next to the pillar are fitted with replaceable bits 3 to form a cutting edge. The conveyor and undercutter is reciprocated in a manner generally similar to a common shaker conveyor by drive mechanism of a unit D, and it is automatically fed toward the pillar upon operation of the conveyor, by means including feed screws 4 having threaded engagement in the bases of jacks 5 fixed between the roof and floor of the mine. The feed screws are rotated by ratchet driving devices including ratchet wheels 6 secured on the feed screws 4 and engaged by spring pressed pawls like that shown at 7 in Figure 7. These pawls are pivoted in slides 8 which connect rod sections 9 and are movable on shoes 10 which rest on the mine floor and connect tubular members 11 through which the rod sections 9 extend. Antifriction bearings (not shown) are provided between the other side of the conveyor and the shoes 10, as shown in my said patent, to promote easy reciprocation of the conveyor. The drive mechanism of unit D includes a driven rock shaft 12 connected by arm 13 (Figure 7), link 14 and lever 15 to the adjacent end of the rod section 9. The rod section 9 at the other end of the conveyor is attached to a tension spring 16 secured to the pivot 17 of a sector-shaped conveyor plate 18 which oscillates about pivot 17 and is connected to the adjacent plate 1, as at 19, for actuation thereby. At the unit D, the conveyor has an inclined discharge pan 20 that extends across said unit. Rock shaft 12 is connected to pan 20 by arms 21 and connecting rods or pitmans 22, and the drive mechanism of unit D causes differential rocking movement of shaft 12 so that the conveyor is reciprocated with a fast rearward stroke and a slow forward stroke to convey the coal as denoted by the arrows A in Figure 1. As the arms 21 are longer than arm 13, pawls 7 move relative to ratchet wheels 6 so as to intermittently turn the latter and the feed screws 4 to automatically feed the conveyor toward the pillar as the conveyor reciprocates and the mining operation proceeds.

The present invention is particularly concerned with the construction of unit D, and particularly the drive mechanism thereof and the means for mounting and automatically feeding such mechanism laterally with the conveyor during operation of the latter.

The unit D includes a bed adapted to rest on the mine floor and composed of a plurality of wide and shallow channel sections 23 separably bolted together at 24 in end-to-end abutting relation. The bed sections 23 have interfitting plates 25 and 26 at their ends to maintain them in alignment. Secured in and along the sides of the sections 23 are guideways 27 which slidably receive base flanges 28 of a carriage 29, and which have flanges 30 along their inner sides that are formed on their upper faces with toothed racks 31. The bed is anchored in a fixed position by suitable jacks 32 engaged at their upper ends with the roof of the mine and at their lower ends in sockets provided at 33, at suitable intervals, in the guideways 27.

A constant speed drive motor 34 is mounted on one end of carriage 29, and adjacent this end the carriage is formed to provide a housing 35 having a removable cover plate 36 and containing the driving mechanism between motor 34 and rock shaft 12. The discharge pan 20 extends across the carriage 29 near the other end thereof, and this pan is mounted at 37 upon carriage 29 for tilting movement relative to the latter to compensate for differences in the elevation of the mine floor where the conveyor is arranged and where the bed of unit D is arranged. Also, an anti-friction bearing is provided at 38 between the pivotal mounting 37 and the pan 20 at each side of the latter, so as to promote free reciprocation of pan 20 relative to carriage 29. It will be noted that discharge pan 20 is thus mounted on carriage 29 for movement with the latter relative to the base composed of sections 23, said base extending transversely of and beneath the pan 20 so that the latter is laterally adjustable with the conveyor toward the face of the pillar as the mining operation proceeds. It will be noted that rock shaft 12 extends transversely of and beneath the pan 20, and connecting rods 22 are disposed at opposite sides of the pan 20 and universally connected to the latter, as generally indicated at 39.

The drive shaft of motor 34 is provided with a pinion 40 within housing 35, and pinion 40 meshes with a spur gear 41 secured on a shaft 42 which is journaled in bearings 43 and 44 respectively provided in an end of housing 35 and in a wall 45 provided within the latter. A pinion 46 is secured on shaft 42 and meshes with a spur gear 47 secured on a shaft 48 journaled at one end in a bearing 49 carried by a wall 50 also provided within housing 35. The shaft 48 is provided with a crank 51 having a rocker or crank pin 52. The other end portion of shaft 48 comprises a tubular member 53 journaled in a bearing 54 provided in a still further wall 55 fixed within housing 35. Journaled on crank pin 52 is an eccentric 56 having a reduced end on which is secured a pinion 57 meshing with a similar pinion 58 secured on one end of a shaft 59 extending through and journaled in the tubular end or member 53 of crank shaft 48. The eccentric 56 is received within one end of a connecting rod 60, and a bearing 61 is provided between eccentric 56 and this end of connecting rod 60. The other end of connecting rod 60 is pivoted at 62 on a rocker pin between a pair of arms 63 secured on rock shaft 12. The end of rock shaft 12 adjacent arms 63 is journaled in a bearing 64 provided in wall 45, and rock shaft 12 projects through a stuffing box provided at 65 in an end of housing 35. Suitable bearings 66 are provided for the projecting end portion of rock shaft 12 upon the carriage 29 and at the inner sides of the arms 21. The housing 35 is made grease-tight so that it may be filled with lubricant to minimize wear of the various moving parts within the housing. The stuffing box 65 prevents escape of grease from the housing about rock shaft 12, and eccentric 56 is preferably made in sections as shown in Figure 12 to facilitate manufacture and assembly. Secured on the other end of shaft 59 is an arm 67, and keyed on rock shaft 12 is a shorter arm 68 which is connected to said arm 67 by a link 69.

As shown more clearly in Figures 4, 6 and 7, the ratchet wheel 6 nearest rock shaft 12 is secured on a shaft 70 journaled on a housing 71. The shaft 70 also carries a worm 72 that meshes with a worm gear 73 secured on a shaft 74 journaled upon carriage 29 and projecting into housing 71. Spur pinions 75 are secured on the ends of shaft 74 and mesh with the racks 31. Thus, as shaft 70 is intermittently turned by the action of the associated pawl 7 and ratchet wheel 6 during operation of the conveyor, the pinions 75 are driven through the gearing described to intermittently automatically feed the carriage 29 toward the pillar in the same manner as the conveyor is fed toward the same by the ratchet driven feed screws 4. Of course, the traveling movement of the carriage is caused by the meshing of pinions 75 with racks 31 fixed upon the stationary bed composed of sections 23. By thus mounting the drive mechanism upon a sliding carriage, a more efficient construction is had than that shown in my above mentioned patent embodying a sleeve slidable on the rock shaft 12 and in a guideway of the bed. It is not necessary to bodily move the entire unit D from time to time, because as the carriage completely clears a section 23 of the bed, such section may be moved to the opposite end of the bed so as to extend the latter at the end thereof toward which the carriage is being moved.

In operation, motor 34 is suitably thrown into operation so as to rotatably drive the crank 51 and to thereby oscillate shaft 12 through the medium of connecting rod 60 and arms 63. As shaft 12 is rocked, a rocking motion is imparted to shaft 59 by arm 68, link 69 and arm 67, thereby causing reciprocating rotary motion of eccentric 56 as the latter rotates about the axis of shaft 48. In this way, the rocking motion of shaft 12 is automatically variably accelerated and decelerated to a predetermined extent during each revolution of crank shaft 48. The motion of the connecting rods 22 and the conveyor is similarly accelerated and decelerated during each reciprocation of the same so as to move the conveyor with a rapid rearward and slower forward movement characterized as described in connection with the diagrams of Figures 14 to 16, inclusive. In this way, efficient travel of coal is had to and through the discharge pan 20, from whence the coal may be discharged onto a conventional conveyor arranged in the entry where the drive mechanism is located. The manner in which the conveyor and drive mechanism are fed laterally during operation of the conveyor has already been described, and it is believed that the construction, operation and advantages of the invention will be fully understood and appreciated by those skilled in the art without further description.

Having described the invention, what is claimed as new is:

1. A shaker conveyor operating mechanism assembly comprising means for driving said conveyor assembly at a predetermined variable acceleration including a uniformly rotatable drive crank having a rocker pin, a rock shaft having an arm provided with a rocker pin, and means for rocking said rock shaft at a predetermined variable angular velocity including a connecting rod operatively connecting said rocker pins, an eccentric journaled on one of said rocker pins and having an end of said connecting rod journaled thereon, and means to turn said eccentric relative to said one rocker pin.

2. A shaker conveyor operating mechanism assembly comprising means for driving said conveyor assembly at a predetermined variable acceleration including a uniform rotatable drive crank having a rocker pin, a rock shaft having an arm provided with a rocker pin, means for rocking said rock shaft at a predetermined variable angular velocity including a connecting rod operatively connecting said rocker pins, an eccentric journaled on one of said rocker pins and having an end of said connecting rod journaled thereon, and means to impart a rotary motion to said eccentric at a variable angular velocity in response to movement of said connecting rod by said drive crank.

3. A shaker conveyor drive mechanism comprising a rock shaft having an arm, arm and link means to connect said rock shaft to a reciprocable conveyor assembly, a crank embodying a crank pin, a connecting rod operatively connecting said crank pin with said first-named arm, an eccentric journalled on said crank pin and having an end of the connecting rod journalled thereon, means for rotatably driving said crank at a constant speed, and means including a connecting rod operatively pivotally secured to said rock shaft operatively connecting said rock shaft to said eccentric for causing said eccentric to make one revolution about said crank pin for each rotation of the crank.

CHARLES E. TIBBALS.

REFERENCES CITED

The following references are of record in the file of this patent:

UNITED STATES PATENTS

| Number | Name | Date |
|---|---|---|
| 989,106 | Arbuthnot | Apr. 11, 1911 |
| 2,114,153 | Sloane | Apr. 12, 1938 |
| 2,142,382 | Sloane | Jan. 3, 1939 |
| 2,362,844 | Nyborg | Nov. 14, 1944 |
| 2,410,482 | Doberstein | Nov. 5, 1946 |
| 2,451,199 | Carlson | Oct. 12, 1948 |